United States Patent
Keens

(10) Patent No.: US 11,326,950 B2
(45) Date of Patent: May 10, 2022

(54) RETRO-INTERFEROMETER HAVING ACTIVE READJUSTMENT

(71) Applicant: Bruker Optik GmbH, Ettlingen (DE)

(72) Inventor: Axel Keens, Karlsruhe (DE)

(73) Assignee: BRUKER OPTICS GMBH & CO. KG, Ettlingen (DE)

( * ) Notice: Subject to any disclaimer, the term of this patent is extended or adjusted under 35 U.S.C. 154(b) by 0 days.

(21) Appl. No.: 17/074,974

(22) Filed: Oct. 20, 2020

(65) Prior Publication Data

US 2021/0033381 A1 Feb. 4, 2021

Related U.S. Application Data

(63) Continuation of application No. PCT/EP2019/060049, filed on Apr. 18, 2019.

(30) Foreign Application Priority Data

Apr. 26, 2018 (DE) ...................... 10 2018 206 519.5

(51) Int. Cl.
  *G01J 3/453* (2006.01)
  *G01B 9/02* (2022.01)
  (Continued)

(52) U.S. Cl.
  CPC ........ *G01J 3/4535* (2013.01); *G01B 9/02028* (2013.01); *G01B 9/02067* (2013.01);
  (Continued)

(58) Field of Classification Search
  CPC ............ G01B 9/02028; G01B 9/02067; G01B 2290/45; G01B 2290/60; G01J 3/4535
  See application file for complete search history.

(56) References Cited

U.S. PATENT DOCUMENTS

| | | |
|---|---|---|
| 4,345,838 A | 8/1982 | Buijs et al. |
| 4,711,573 A | 12/1987 | Wijntjes et al. |
| | (Continued) | |

FOREIGN PATENT DOCUMENTS

| | | |
|---|---|---|
| CN | 102759402 A | 10/2012 |
| DE | 4212143 A1 | 11/1992 |
| | (Continued) | |

OTHER PUBLICATIONS

Yang, Kun ; Zeng, Libo: An Intelligent Dynamic Alignment System for Interferometer of Fourier Transform Spectrometer, Physics Procedia, vol. 33, 2012, pp. 1695-1701.
(Continued)

*Primary Examiner* — Michael A Lyons
(74) *Attorney, Agent, or Firm* — Edell, Shapiro & Finnan, LLC

(57) ABSTRACT

An interferometer arrangement includes a beam splitter (8), two retroreflectors (15, 16), a drive (24) that moves at least one of the retroreflectors to alter an optical path difference between interferometer arms (13, 14), a converging element (18) for reference light, and a reference light detector (19) with at least three detector areas (19a-19d). First and second pairs of detector areas are aligned in respective first and second directions, wherein the first direction, the second direction and a central propagation direction of the reference light at the reference light detector are linearly independent. At least two actuators (9, 10) alter a lateral shear between two reference light partial beams (11, 12), which are reflected back from the interferometer arms and superimposed at the beam splitter, in at least two degrees of freedom. Control electronics (38) control the actuators depending on signals (Sa-Sc) at the detector areas, thereby minimizing the shear.

20 Claims, 5 Drawing Sheets

(51) Int. Cl.
*G02B 27/10* (2006.01)
*G01B 9/02015* (2022.01)
*G01B 9/02055* (2022.01)

(52) U.S. Cl.
CPC ...... *G02B 27/1006* (2013.01); *G01B 2290/45* (2013.01); *G01B 2290/60* (2013.01)

(56) References Cited

U.S. PATENT DOCUMENTS

| | | | |
|---|---|---|---|
| 5,671,047 | A | 9/1997 | Curbelo |
| 5,883,712 | A | 3/1999 | Coffin |
| 5,923,422 | A | 7/1999 | Keens et al. |
| 9,109,869 | B2 | 8/2015 | Hirao |
| 2013/0044327 | A1* | 2/2013 | Gaucel ............... G01J 3/4535 356/451 |
| 2013/0222790 | A1* | 8/2013 | Hirao ............... G01B 9/02061 356/51 |
| 2019/0204065 | A1* | 7/2019 | Akagawa ........... G01B 9/02067 |

FOREIGN PATENT DOCUMENTS

| | | |
|---|---|---|
| DE | 19704598 C1 | 6/1998 |
| DE | 102014226487 A1 | 6/2016 |
| JP | 02253103 A * | 10/1990 |
| JP | H1194514 A | 4/1999 |
| WO | 2012056813 A1 | 5/2012 |

OTHER PUBLICATIONS

Sabbah Samer et al: "Remote sensing of gases by hyperspectral imaging: system performance and measurements", Optical Engineering, Soc. of Photo-Optical Instrumentation Engineers, Bellingham, vol. 51, No. 11, Nov. 2012, 10 pages.

Favrov A V et al: "Common-Path Achromatic Interferometer-Coronagraph: Images From a Breadboard Demonstrator", Applied Optics, Optical Society of America, Washington DC; US, vol. 46, No. 28, (2007), 12 pages.

Froebs M et al: "Experimental demonstration of reduced tilt-to-length coupling by using imaging systems in precision interferometers", Proceedings of SPIE; [Proceedings of SPIE ISSN 0277-786X vol. 10524], SPIE, US, vol. 10562, Sep. 25, 2017, 10 pages.

International Search Report, PCT/EP2019/060049, dated Jul. 15, 2019, 6 pages.

German Office Action with English translation, Application No. 10 2018 206 519.5, dated Jan. 11, 2019, 10 pages.

Xuemin et al., "Precise Alignment of Separated Sagnac Interferometer", including English translation, Chinese Journal of Lasers, vol. 40, No. 4, Apr. 2013, 13 pages.

* cited by examiner

RETRO-INTERFEROMETER HAVING ACTIVE READJUSTMENT

CROSS REFERENCE TO RELATED APPLICATIONS

This is a Continuation of International Application PCT/EP2019/060049, which has an international filing date of Apr. 18, 2019, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2018 206 519.5 filed on Apr. 26, 2018.

FIELD OF THE INVENTION

The invention relates to an interferometer arrangement, comprising
an input for useful light,
a beam splitter,
two retroreflectors for establishing two interferometer arms,
a drive for moving at least one of the retroreflectors in order to alter an optical path difference between the interferometer arms,
a reference light source for coherent reference light, in particular a reference laser,
an output for useful light,
and a reference light detector.
Such an interferometer arrangement was disclosed by DE 10 2014 226 487 A1.

BACKGROUND

Known interferometer arrangements can be used in particular in FTIR (=Fourier Transform Infrared) spectrometry. For this, as useful light, broadband IR (=infrared) light in an interferometer is split into two partial beams in two interferometer arms and a path difference between the partial beams is produced. From this, a useful light detector is read, onto which the superimposed partial beams are incident after interaction with a sample to be examined. Reading the useful light detector is repeated for different path differences. When the partial beams are superimposed, interference occurs which, depending on the path difference and on the frequency of the IR light, results in the reduction or increase of the irradiance at the useful light detector. The intensity data of the useful light detector, which are dependent on the path difference, are subjected to a Fourier transform, as a result of which a spectrum of the sample to be examined is obtained.

For this measurement method it is important to be able to accurately specify or track the path difference between the partial beams. For this purpose, it is known to use, besides the broadband IR light for the actual measurement of the sample, additionally a reference laser, the narrowband light of which likewise passes through the interferometer, and to correctly ascertain the path difference between the interferometer arms from the constructive and destructive interference of said light at a reference light detector.

The partial beams are usually generated by a beam splitter, reflected at mirrors in the interferometer arms and superimposed again in the beam splitter.

U.S. Pat. No. 5,883,712 A discloses an interferometer arrangement comprising plane mirrors in two orthogonal interferometer arms, wherein one of the plane mirrors is movable in the beam direction in order to alter the path difference. If the plane mirrors are not oriented exactly orthogonally with respect to one another, the partial beams experience an angular error (that is to say that the partial beams are tilted relative to one another), and the partial beams cannot fully interfere, which can lead to a loss of intensity or even to totally unusable measurement results. A mutual tilting of the mirrors can occur for example as a result of temperature fluctuations or as a result of inaccuracies in the bearing of the movable mirror.

Physics Procedia 33 (2012), 1695-1701 discloses, in the case of an interferometer comprising plane mirrors, installing magnetic actuators at the stationary plane mirror in order to adjust the mirror. For this purpose, the phase difference of a reference laser beam is detected at two pairs of photodiodes installed in two directions orthogonal to one another and is used for a dynamic alignment. An angular error can be compensated for as a result. As an alternative to the dynamic alignment, the use of cube corner reflectors (retroreflectors) is mentioned, which can reflect light back along their input path and therefore avoid an angular error of the partial beams.

Interferometers based on retroreflectors (cube corner reflectors) are disclosed by DE 10 2014 226 487 A1, DE 197 04 598 C1 or DE 42 12 143 A1, for example. Although these interferometers do not have an angular error of the partial beams to be superimposed, a lateral displacement of the retroreflectors orthogonally to the optical axis is not compensated for. Therefore, an undesirably low evaluatable or fluctuating useful light intensity at the useful light detector can occur even in these interferometers.

SUMMARY

One object of the invention is to provide an interferometer arrangement based on retroreflectors which enables a higher evaluatable and stabler useful light intensity.

BRIEF DESCRIPTION OF THE INVENTION

This and related objects are achieved in a simple and effective way with an interferometer arrangement of the type mentioned in the introduction which is characterized in that the reference light detector has at least three detector areas, wherein the detector areas of a first pair of detector areas are lined up in a first direction, and the detector areas of a second pair of detector areas are lined up in a second direction, and wherein the first direction, the second direction and a central propagation direction of the reference light at the reference light detector are linearly independent, in particular orthogonal with respect to one another, and in that the interferometer arrangement furthermore comprises
a converging element for reference light, preferably a converging lens, arranged between the beam splitter and the reference light detector, for focusing the reference light from the beam splitter,
at least two actuators for altering a lateral shear between two reference light partial beams, which are reflected back from the interferometer arms and are superimposed again at the beam splitter, in at least two degrees of freedom, in particular arranged at the beam splitter or arranged at at least one of the retroreflectors,
and control electronics for controlling the actuators depending on signals at the detector areas of the reference light detector.

The interferometer arrangement according to the invention makes it possible to alter and to control, and in particular to stabilize, a lateral shear (that is to say a mutual offset transversely with respect to the propagation direction of the beams that have been superimposed again) between the two partial beams of the two interferometer arms of the interferometer arrangement.

The position and orientation of the beam splitter and of the retroreflectors in an interferometer arrangement can fluctuate over the course of time, in particular as a result of thermal expansion effects in the event of temperature fluctuations. Although these alterations do not result in an angular error of the superimposed partial beams from the interferometer arms, they can result in a lateral offset of the superimposed partial beams. As the lateral offset increases, the evaluatable useful light intensity becomes lower on account of destructive interference, and, accordingly, the information about a sample to be examined with the useful light is less meaningful, and the comparability of different measurements deteriorates.

The reference light is usually (and typically also in the context of the invention) used to track the path difference between the interferometer arms. In the context of the present invention, the reference light is (also) used to detect the lateral shear of the reference light partial beams (which substantially corresponds to the lateral shear of the useful light partial beams) and to evaluate it for stabilizing, in particular minimizing, the lateral shear. The lateral shear of the reference light partial beams corresponds to the greatest possible extent to the lateral shear of the useful light partial beams since the useful light partial beams pass through substantially the same beam path, in particular with the same retroreflectors and the same beam splitter.

The required information about the quality of the instantaneous adjustment of the partial beams of the interferometer arms is gathered from the so-called Haidinger fringes. In order to obtain this interference having equal inclination, the interferometer arrangement is illuminated with the reference light along its optical axis. In this case, it is necessary to ensure a sufficiently large spread of the reference light, for instance a sufficiently large divergence of the reference light or a sufficiently large angular difference between discrete partial beams of the reference light; for this purpose, it is possible to arrange a diverging element (for instance a diverging lens) or a splitting element (for instance a beam splitter and wedge plate arrangement) between reference light source and beam splitter, or else to choose a reference light source having an inherently large divergence (for instance a VCSEL diode). Desired, different path differences are produced by the corresponding beam portions having different directions; the path differences become visible through the interference pattern. The interference pattern (Haidinger fringes) that arises at infinity is imaged via the converging element onto the reference light detector having the two pairs of detector areas.

In the case of an optical path difference of zero (ZPD zero path difference) for example, an interference pattern in the form of straight fringes arises in the case of a lateral shear of the reference light partial beams, wherein the fringes extend perpendicularly to the shear direction and their spacing is inversely proportional to the absolute value of the shear. In this specific case, the Haidinger fringes have a radius of infinite magnitude.

In the case of a uniform feed of the interferometer arrangement, sinusoidal electrical signals are obtained at the detector areas. A superimposed interference pattern in the form of straight fringes results in a phase difference between the signals of the detector areas of a respective pair. The phase difference is a direct measure of the shear of the reference light partial beams in the direction of these two detector areas, and thus a measure of the misalignment of the interferometer arrangement with regard to the direction in which the detector areas are lined up. With the signals of the two pairs of detector areas, the adjustment state of the interferometer arrangement can therefore be fully detected. The phase differences can be used to control the actuators, for instance in a closed control loop, in order thus to compensate for a misalignment of the interferometer arrangement or to accurately maintain a desired adjustment position. A high and stable useful light intensity can be ensured as a result.

The interferometer arrangement according to the invention is typically used to record an FTIR spectrum of a sample. The sample is typically arranged between the beam splitter and a useful light detector (which is arranged at or downstream of the output for useful light). The reference light typically does not pass through the sample. The reference light is generally also used (in addition to the control of the actuators) to track the path difference between the interferometer arms.

The interferometer arrangement can comprise a dedicated useful light source, in particular a broadband IR light source, which provides its useful light at the useful light input. However, it is also possible to use an external useful light source, in particular broadband IR useful light source, for example the sun. The useful light detector can be embodied in particular as an IR detector.

With the at least two actuators the interferometer arrangement can be adjusted in such a way that a mutual, lateral displacement of the retroreflectors orthogonally to the optical axis can be compensated for. The two degrees of freedom can be, in particular, a mutual displacement of the partial beams of the interferometer arms perpendicular to the beam direction and within the interferometer plane spanned by the vertex of one of the two retroreflectors, its mirror image generated at the beam splitter and the optically effective center of the beam splitter, and a displacement perpendicular to the beam direction and perpendicular to said plane. For this purpose, the actuators are typically arranged at one of the retroreflectors or at the beam splitter; however, it is also possible, for example, to arrange a deflection mirror between the beam splitter and a retroreflector, and to adjust the deflection mirror using the actuators. If the actuators are arranged at a retroreflector, the retroreflector is preferably embodied such that it is not movable (in relation to the optical path difference between the interferometer arms). If both retroreflectors are embodied as movable, for instance on a common pendulum, the actuators are preferably arranged at the beam splitter.

The reference light source typically comprises an He—Ne laser or a diode laser. The reference light detector (which can also be referred to as a reference light detector arrangement) can be realized with one overall component, on which the at least three detector areas are formed (for instance with a quadrant detector); alternatively, the reference light detector can be embodied with a plurality of separate individual components, on which the at least three detector areas are formed individually (for instance with three separate individual detectors).

Exemplary Embodiments of the Invention

In one preferred embodiment of the interferometer arrangement according to the invention, it is provided that the interferometer arrangement is configured such that reference light reaching the beam splitter from the reference light source has at the beam splitter a minimum spread MSP, in particular established by a minimum divergence MDIV of the reference light or a minimum intermediate angle MZW of discrete partial beams of the reference light, and that MSP≥2 mrad, preferably MSP≥5 mrad in particular wherein the arrangement comprises a diverging element for the reference light, preferably a diverging lens, arranged between the reference light source and the beam splitter, or a reference light source having an inherent divergence DIV≥MSP, or a splitting element for the reference light, preferably a beam splitter and wedge plate arrangement, which splits the reference light among three or four discrete partial beams, which form the minimum intermediate angle MZW in pairs, and which impinge on separate detector areas of the reference light detector. A larger spread of the reference light makes it possible to illuminate a larger region of the Haidinger fringes such that a larger phase difference can be measured by way of the illuminated region. The minimum spread MSP can be achieved in particular by way of the divergence of the reference light (where MSP=MDIV), or else by way of the intermediate angle of discrete partial beams of the reference light (where MSP=MZW).

In a retro-interferometer, the output-side shear of the reference light partial beams amounts to double the lateral displacement of the vertices of the two retroreflectors with respect to one another, measured orthogonally to the optical axis. A full angle of divergence DIV of the reference light source, measured in radians, illuminates a radial angle coordinate ALPHA of ±DIV/2 in the focal plane of the reference light detector. For a given shear SHEAR of the reference light partial beams, measured in units of the wavelength of the reference light, the following holds true in the case of ZPD for the order N of the straight fringes comprising the interference pattern $N$=SHEAR*ALPHA and thus for the phase difference PHI between the center and the illumination limit $PHI/(2\pi)$=SHEAR*DIV/2.

Thus

DIV=$PHI/(\pi$*SHEAR).

Since the phase difference between two detector areas is measured, the integrating effect of these areas and also the decreasing intensity of the reference light toward larger angles have to be taken into account, which reduces the sensitivity by approximately a factor of 3. This yields the following for the minimum divergence

MDIV≥$PHI$/SHEAR.

The (in particular apparatus-dictated or measurement method-dictated) "resolution limit" of the phase difference determination method applied has to be used here for PHI; PHI is usually between 0.3° and 2° (i.e. between 5 mrad and 35 mrad). The maximum permissible lateral shear of the reference light partial beams for which the interferometer arrangement is still deemed to be stable should be used here for SHEAR. That is the case if the signal amplitude of the modulated useful light at the useful light detector for the shortest wavelength of the spectral measurement range, given a constant input signal, likewise remains (approximately) constant. SHEAR is usually 0.25 μm to 1.5 μm (i.e. 0.4 to 2.5 wavelengths with the use of an HeNe laser as reference light source). With these values, for MDIV this yields a range of 2 mrad to 88 mrad, with a typical value being 5 mrad. The minimum divergence MDIV is typically identical for the first and second directions, but it can also be different for the first and second directions. By way of example, a VCSEL can be used as reference light source having an inherent divergence DIV≥MDIV.

These considerations hold true in a similar way for the minimum intermediate angle MZW with the use of three or four discrete partial beams that are generated from the reference light by a splitting element. In this embodiment, the diverging element is omitted and the reference light source should have as little divergence as possible. In the case of three discrete partial beams, one of the discrete partial beams (this partial beam typically being on the optical axis) is used in both pairs of detector areas or the associated detector area belongs both to the first pair and to the second pair of detector areas. Concentrating the reference light power on only three or four discrete partial beams enables the phase differences to be determined with particularly low noise.

In accordance with an embodiment in which the reference light detector comprises a quadrant diode, in particular a silicon quadrant diode, a current-voltage converter is connected downstream of the quadrant diode for each detector area used by the control electronics. This arrangement is cost-effective and has proved worthwhile in practice.

An embodiment is also advantageous in which the beam splitter is tiltable about two linearly independent axes, in particular axes orthogonal to one another and to a normal to the beam splitter, with the actuators. This embodiment can be chosen, in particular, if both retroreflectors for altering the path difference are embodied as movable (for instance on a common pendulum); in this case, the tilting of the beam splitter in order to compensate for lateral shear is particularly simple from a structural standpoint.

In another advantageous embodiment, one of the retroreflectors is displaceable along two linearly independent directions, in particular directions orthogonal to one another and to the optical axis, with the actuators. This design can be chosen, in particular, if only one of the retroreflectors for altering the path difference is movable. The actuators can then engage on the (in relation to the path difference) fixed retroreflector, which can in turn be embodied in a simple manner from a structural standpoint. The actuators are typically embodied as piezo-actuators since the regulating distances required are typically in the 10 μm range.

Exemplary Methods According to the Invention

The scope of the present invention also includes a method for operating an interferometer arrangement, in particular an interferometer arrangement according to the invention as explained above, wherein coherent reference light from a reference light source is split at a beam splitter between a first interferometer arm having a first retroreflector and a second interferometer arm having a second retroreflector, and the reference light from the two interferometer arms is superimposed again at the beam splitter and is detected at a reference light detector, wherein at least one of the retroreflectors is moved in repeating movement cycles and the optical path difference between the interferometer arms is thereby altered, characterized in that the reference light is focused downstream of the beam splitter, in particular by a converging element between beam splitter and reference light detector, in that the reference light detector has at least three detector areas, wherein the detector areas of a first pair of detector areas are lined up in a first direction, and the detector areas of a second pair of detector areas are lined up in a second direction, and wherein the first direction, the second direction and a central propagation direction of the reference light at the reference light detector are linearly independent, in particular orthogonal with respect to one another, in that at least for a portion of the movement cycles in each case

- a first phase difference between two reference light components detected at the first pair of detector areas is determined,
- a second phase difference between two reference light components detected at the second pair of detector areas is determined, and at least two actuators for altering a lateral shear between two reference light partial beams, which are reflected back from the interferometer arms and are superimposed again at the beam splitter, are readjusted depending on the two phase differences, in particular wherein the two phase differences are kept substantially constant by way of a multiplicity of movement cycles. The method according to the invention makes it possible to prevent or compensate for a lateral shear—occurring over the course of time—of the partial beams of the interferometer arms in the interferometer arrangement, for instance owing to a small change in the position or orientation of the beam splitter or of the retroreflectors.

The readjustment according to the invention makes it possible to keep the phase differences approximately constant over many movement cycles, in particular over many recordings of useful light interferograms, or permanently constant (or to keep them proceeding in the same way or in a known way at least for different movement cycle blocks). The phase differences are generally readjusted to fixed phase difference values. By virtue of the method according to the invention, the interferometer arrangement is particularly stable or can yield measurement results that are reproducible very well.

While in the case of an optical path difference of zero, in the case of a lateral shear of the reference light partial beams, an interference pattern in the form of straight fringes arises at the reference light detector, a constricting, ring-shaped interference pattern arises as the optical path difference increases, the center of said interference pattern being displaced relative to the situation without such a shear. The phase differences will therefore depend on the path difference, such that the phase differences are expediently referred to a specific path difference (preferably zero, ZPD zero path difference). It is also possible, but more difficult, to detect the progression of the phase differences in relation to the optical path difference and to include it in the control, since the exact progression depends on the illumination of the reference light detector and is substantially independent of the illumination only in the vicinity of ZPD. Preferably, a readjustment is effected at least for every hundredth movement cycle, preferably for every movement cycle. On the other hand, in many cases, for instance when there are only slow temperature fluctuations, an occasional readjustment is sufficient, for instance for every fifth movement cycle or less frequently. The movement cycles typically proceed at a frequency of 0.3-40 Hz, usually 1-5 Hz.

The adjustability of the interferometer arrangement with the (at least) two actuators in relation to the (at least) two degrees of freedom is configured such that a lateral displacement of the retroreflectors orthogonally to the optical axis can be compensated for. Typically, for this purpose, one of the retroreflectors is displaced in two directions or the beam splitter is tilted about two axes; however, it is also possible to arrange a deflection mirror between the beam splitter and a retroreflector, and to adjust (tilt and/or displace) the deflection mirror. The two degrees of freedom can be, in particular, a mutual displacement of the partial beams of the interferometer arms perpendicular to the beam direction and within the interferometer plane spanned by the vertex of one of the two retroreflectors, its mirror image generated at the beam splitter and the optically effective center of the beam splitter, and a displacement perpendicular to the beam direction and perpendicular to said plane.

The readjustment of the interferometer arrangement can be performed still during or else after a movement cycle (or, if appropriate, an associated recording of an interferogram), with which the phase determination was effected. Preferably, the readjustment is effected after a movement cycle, particularly preferably in a reversal phase of the drive.

In one preferred embodiment of the method according to the invention, it is provided that the reference light reaching the beam splitter from the reference light source has at the beam splitter a minimum spread MSP, in particular established by a minimum divergence MDIV of the reference light or a minimum intermediate angle MZW of discrete partial beams of the reference light,
and that MSP≥2 mrad, preferably MSP≥5 mrad, in particular wherein
- the reference light from the reference light source is expanded to a greater divergence by a diverging element between the reference light source and the beam splitter, or
- a reference light source having an inherent divergence DIV≥MSP is selected, or
- the reference light is split into three or four discrete partial beams by a splitting element, and the discrete partial beams form the minimum intermediate angle MZW in pairs and impinge on separate detector areas of the reference light detector. A sufficiently large spread of the reference light facilitates the measurement of the phase differences at the pairs of detector areas. The minimum spread MSP can be achieved in particular by way of the divergence of the reference light (where MSP=MDIV), or else by way of the intermediate angle of discrete partial beams of the reference light (where MSP=MZW).

In one advantageous variant, the degrees of freedom comprise tiltings of the beam splitter with respect to two linearly independent axes, in particular axes orthogonal to one another and to a normal to the beam splitter. This is simple to establish, particularly if the two retroreflectors are arranged on a common pendulum.

In accordance with a further variant, the degrees of freedom comprise displacements of one of the retroreflectors with respect to two linearly independent directions, in particular directions orthogonal to one another and to the optical axis. This is likewise structurally simple, particularly if the retroreflector in relation to establishing the path difference between the interferometer arms is stationary.

According to yet another variant, a respective phase difference is determined by measurement of the temporal separation of the zero crossings of two electrical detector signals, which were determined in each case with respect to the reference light components, relative to their period length. The phase differences can then be determined particularly simply. In particular, it is possible to determine the zero crossings with the condition for the signal of the respective detector area "Instantaneous value—moving average value=0". The moving average value can be determined over 100 signal periods, for example.

In one preferred variant, it is provided that in each case only an always identical partial region of the movement cycle is used for determining the phase differences, in particular wherein the partial region comprises fewer than 1000 wavelengths of the reference light, and that the partial region contains an optical path difference between the interferometer arms of zero, in particular wherein the partial region is chosen symmetrically around the optical path difference of zero. The influence of the adjustment of the reference light beam path on the phase is the least in the region around the path difference of zero.

Another preferable variant effects the readjustment of the actuators with a digital PI control, preferably in which a high-voltage amplifier is connected downstream of the PI control per actuator. This has proved to be worthwhile in practice. If the directions in which the reference light detector areas are lined up and the directions in which the actuators are effective are not colinear, the control must additionally carry out a coordinate transformation. The PI (=proportional-integral) control avoids an overshoot during the readjustment of the actuators. Piezo-actuators are typically operated at 100 V to 1000 V.

In one further preferred variant, it is provided that for recording a useful light interferogram
useful light from a useful light source through the input for useful light at the beam splitter is split between the first interferometer arm having the first retroreflector and the second interferometer arm having the second retroreflector, and the useful light from the two interferometer arms is superimposed again at the beam splitter and through the output for useful light is detected at a useful light detector,
and individual useful light amplitude measurements are in each case carried out during a movement cycle with different optical path differences between the interferometer arms, and that a plurality of useful light interferograms are recorded. During the recording of the useful light interferograms, a sample to be examined is arranged in the beam path of the useful light (and typically not in the beam path of the reference light), preferably between beam splitter and useful light detector. During the (successively effected) recordings of the plurality of useful light interferograms, the interferometer arrangement can be stabilized with the readjustment of the actuators according to the invention, such that identical measurement conditions are obtained for the plurality of measurements. The plurality of useful light interferograms can be recorded with different samples, or else in each case a few useful light interferograms with the same sample ("overall measurement", see below). Useful light and reference light are typically guided parallel or antiparallel to one another in the interferometer arrangement. A movement cycle of the at least one retroreflector can be used both for the determination of the phase differences in the reference light and for the individual useful light amplitude measurements. It should be noted that the readjustment of the actuators according to the invention can (and is intended to) also take place when no useful light interferograms are currently being recorded, in order to keep the interferometer arrangement stable for future measurements.

According to a further development of this variant, a plurality of useful light interferograms are recorded in succession for an overall measurement, and in that the individual useful light amplitude measurements of in each case the same optical path difference of the useful light interferograms of the overall measurement are summed. An overall measurement typically includes 10 or more useful light interferograms, or else 1000 or more useful light interferograms, which are typically recorded in successive movement cycles. An improved signal-to-noise ratio is obtained through the summation. According to the invention particularly stable measurement conditions are obtained within the overall measurement. An overall measurement typically takes place with a single sample overall. The summed individual useful light amplitude measurements of the overall measurement are typically subjected to a Fourier transform in order to obtain a spectrum, in particular infrared spectrum, of a sample.

Advantageously, it is further provided that a determination of the first and second phase differences and a corresponding readjustment of the at least two actuators are effected at least for every hundredth useful light interferogram of the overall measurement, preferably are effected for every useful light interferogram of the overall measurement. A frequent readjustment of the phase difference makes it possible to obtain particularly stable conditions at the interferometer arrangement. By contrast, when there are only slow temperature fluctuations and given a frequency of recorded useful light interferograms of typically 1-5 Hz, an occasional readjustment is sufficient, for instance in the range of once every 5 seconds.

A development is also advantageous which provides that after exchange or reinstallation of a component of the interferometer arrangement, in particular of the beam splitter or of one of the retroreflectors, firstly an optimum position and/or orientation of the component are/is determined, in particular so as to obtain a maximum intensity of useful light at the useful light detector,
that an associated first initial phase difference value and an associated second initial phase difference value for the reference light components are determined with respect to the optimum position and/or orientation of the component, and that during a subsequent measurement operating mode in which the useful light interferograms are recorded, the first phase difference and the second phase difference are readjusted to the first initial phase difference value determined and the second initial phase difference value determined. This procedure makes it possible to obtain a high and stable useful light intensity. Measurements of samples become particularly meaningful.

Further advantages of the invention are evident from the description and the drawing. The features mentioned above and those explained still further can likewise be used according to the invention in each case individually by themselves or as a plurality in any desired combinations. The embodiments shown and described should not be understood as an exhaustive enumeration, but rather are of exemplary character for outlining the invention.

BRIEF DESCRIPTION OF THE DRAWINGS

The invention is illustrated in the drawing and is explained in greater detail on the basis of exemplary embodiments. In the figures.

DETAIL DESCRIPTION

Overview of the Invention

Interferometers for FTIR spectroscopy are often equipped with two retroreflectors since a possible tilting of these mirrors during their movement for altering the optical path difference is completely compensated for and the quality of the adjustment (i.e. the modulation efficiency) is not influenced. However, another disturbing influence, namely a lateral displacement of the mirrors orthogonally to the optical axis, is not compensated for. This displacement produces a shear of the output beams and misaligns the interferometer (i.e. reduces the modulation efficiency thereof). To put it more precisely, the modulation efficiency of the interferometer decreases if the image of the vertex of one retroreflector mirrored at the beam splitter has a lateral displacement relative to the vertex of the other retroreflector, measured perpendicularly to the optical axis. The displacement can arise e.g. as a result of inaccuracies in the bearing or thermal drift of the components. Although the effect is an order of magnitude smaller than the effect that occurs upon the tilting of the mirrors in a plane-mirror interferometer, it causes considerable disturbance in longer measurement series and especially during operation with shorter wavelengths (NIR, VIS or UV range). This misalignment of the interferometer can be completely compensated for by displacing one of the two retroreflectors in two axes perpendicular to the optical axis, or by tilting the beam splitter in two orthogonal angular degrees of freedom. Both methods are optically equivalent (in the case of small misalignment). In the prior art, a basic adjustment of the interferometer is typically effected only once or before the beginning of a measurement series or when optical components are changed, but not during ongoing operation.

The invention, according to one aspect, provides for metrologically detecting a lateral displacement of the retroreflectors and, in a closed control loop, via actuators that influence the shear of the output beams. This maintains the initial adjustment state of the interferometer over a longer period of time, especially during measurement series with a longer duration. The method according to the invention is also well suited to adjusting the interferometer to the initial adjustment state again automatically after a beam splitter change.

Written Description of the Figures

All the figures show in each case schematic illustrations that are not to scale. In particular, beam divergences and the sizes of optical elements are illustrated in an exaggerated way in order to make them more clearly discernible.

Figure 1:
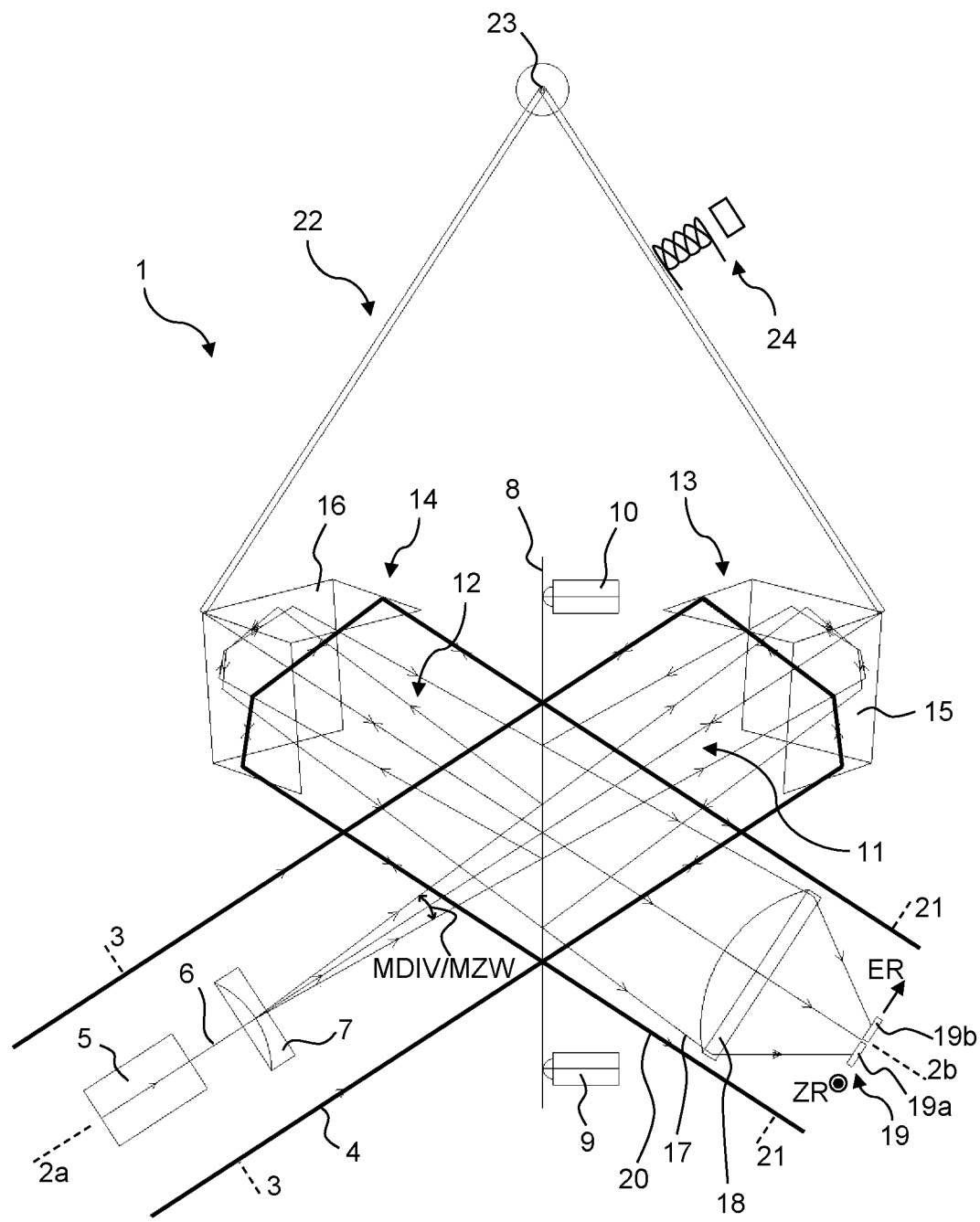
FIG. 1 shows a schematic plan view of a first embodiment of an interferometer arrangement according to the invention, with two retroreflectors on a pendulum.

FIG. 1 shows schematically in plan view a first embodiment of an interferometer arrangement 1 according to the invention.

From a useful light source, not illustrated in more specific detail, a beam of useful light 4 (here of broadband IR light) is radiated into the interferometer arrangement 1 along the input-side optical axis 2a through an input for useful light 3. Coherent, narrowband reference light 6 is radiated in likewise along the input-side optical axis 2a by a reference light source 5, here an HeNe laser.

The reference light 6 from the He—Ne laser is spread, in the design shown expanded conically using a diverging element 7, here a diverging lens, such that a divergence of at least 2 mrad, preferably at least 5 mrad, is ensured, cf. minimum divergence MDIV. In an alternative design, the diverging element 7 can be replaced by a beam splitter and wedge plate arrangement, for example, in order to split the reference light 6 among four discrete partial beams, for example, which in pairs (corresponding to the pairs of detector areas 19a, 19b on which they impinge) form an intermediate angle of at least 2 mrad, preferably at least 5 mrad (beam splitter and wedge plate arrangement not illustrated, but cf. the marginal rays of the reference light 6/17 in FIG. 1 and FIG. 2, which can describe the discrete partial beams), cf. minimum intermediate angle MZW between the (central) propagation directions of the discrete partial beams. The reference light 6 (illustrated by thin lines) and the useful light 4 (illustrated by thick lines) are directed onto a beam splitter 8.

The beam splitter 8 is tiltable about two axes orthogonal to one another via two actuators 9, 10, which are embodied here as piezo-actuators (in this respect, see also FIG. 3); the mounting of the actuators 9, 10 is not illustrated in more specific detail for the sake of simplification. The beam splitter 8 is embodied such that it is substantially flat, planar and semitransparent, with the result that it transmits a first part of the light impinging on it and reflects a second part of the light impinging on it. For the sake of simplification, only the effectively beam splitting plane is illustrated, but not the beam splitter substrate.

At the beam splitter 8 the reference light 6 is accordingly split between two reference light partial beams 11, 12. The reference light partial beam 11 propagates in a first interferometer arm 13 to a retroreflector 15 and is reflected there. The reference light partial beam 12 propagates in a second interferometer arm 14 to a retroreflector 16 and is reflected there. The retroreflectors 15, 16 each have three mirror surfaces oriented at right angles to one another, in a manner corresponding to the inner corner of a cube. The reference light partial beams 11, 12 reflected back from the retroreflectors 15, 16 impinge once again on the beam splitter 8 and are partly reflected and partly transmitted at the beam splitter 8, such that output-side reference light 17 is obtained with a central propagation direction along an output-side optical axis 2b downstream of the beam splitter 8. This reference light 17 is obtained from the superimposition of the reference light partial beams 11, 12 reflected back.

The output-side reference light 17 (in the form of discrete partial beams in the alternative design) is focused by a converging element 18, here a converging lens, onto a reference light detector 19, which is embodied here as a quadrant diode having four detector areas (only two detector areas 19a, 19b of which can be discerned in FIG. 1). A first pair of detector areas 19a, 19b is lined up in a first direction ER, and a second pair of detector areas is lined up in a second direction ZR (perpendicular to the plane of the drawing); the two directions ER, ZR are perpendicular to the output-side optical axis 2b. The output-side optical axis 2b is given by mirroring of the input-side optical axis 2a at the beam splitter 8.

The useful light 4 is also split into useful light partial beams between the interferometer arms 13, 14 at the beam splitter 8, which useful light partial beams are reflected at the retroreflectors 15, 16 and are superimposed to form output-side useful light 20 downstream of the beam splitter 8. The output-side useful light 20 passes through an output for useful light 21 and is detected at a useful light detector (not illustrated).

The two retroreflectors 15, 16 here are secured to a common pendulum 22, which can oscillate about an axis 23 of rotation; the optical path difference between the interferometer arms 13, 14 can be altered as a result. Successive movement cycles can be established by pendulum oscillations. The pendulum 22 is provided with a drive 24, here comprising a permanent magnet arranged in a stationary fashion and an electromagnetic coil arranged on the pendulum 22. By applying electric current to the coil, it is possible for the pendulum 22 to be deflected.

On account of bearing tolerances or else on account of temperature fluctuations, the orientation of the beam splitter 8 and the lateral orientation of the retroreflectors 15, 16 with respect to the associated optical axis 2a, 2b (that is to say the orientation transversely with respect to the optical axis) can vary, which can result in a lateral shear of the superimposed partial beams from the interferometer arms downstream of the beam splitter 8, in substantially the same way for the useful light 20 as for the reference light 17. By tilting the beam splitter 8 with the actuators 9, 10, controlled by way of the phase shifts of reference light components measured at the reference light detector 19 or the detector areas 19a, 19b thereof, said lateral shear can be corrected or eliminated (in this respect cf. FIG. 6).

Figure 2:
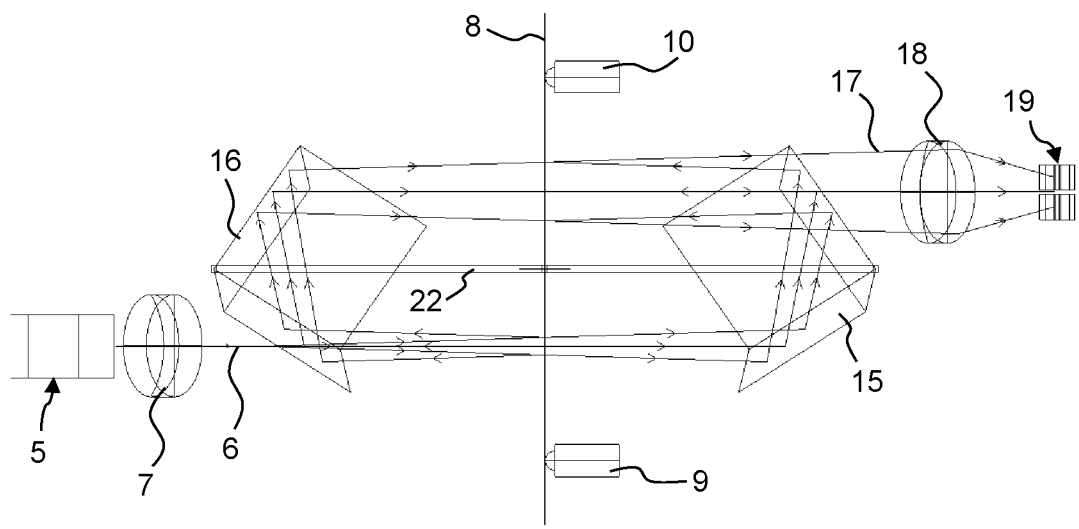
FIG. 2 shows a schematic side view of the interferometer arrangement from FIG. 1.

FIG. 2 shows the interferometer arrangement from FIG. 1 in a side view, the useful light not being illustrated for the sake of simplification.

The input-side reference light 6 firstly propagates in a lower region of the measurement arrangement, while the output-side reference light 17 passes through the measurement arrangement in an upper region. As a result, the central region of the measurement arrangement is available for the useful light.

Figure 3:
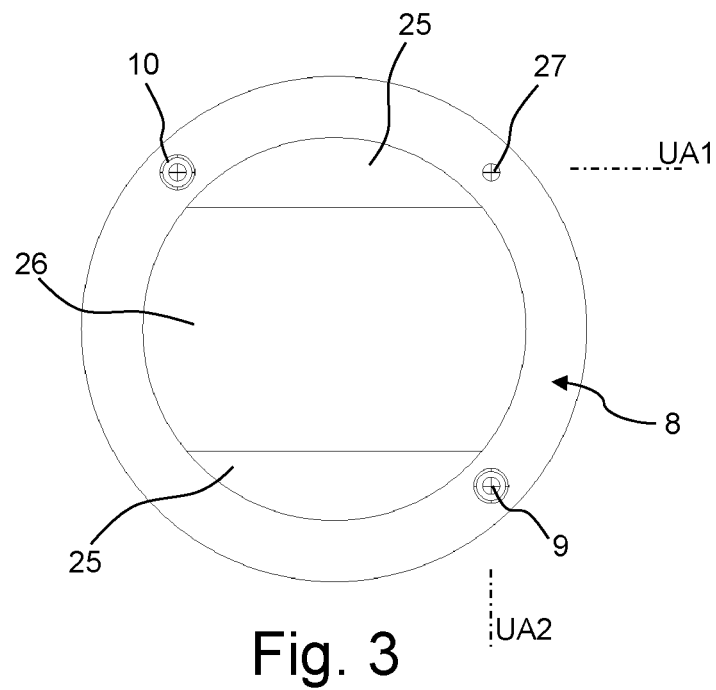
FIG. 3 shows a schematic plan view of the beam splitter of the interferometer arrangement from FIG. 1.

At the beam splitter 8, which is illustrated in a lateral plan view in FIG. 3, it is therefore possible to establish deposited coatings 25 for the reference light (laser light) in an upper and a lower part, and a deposited coating 26 for the useful light (broadband IR radiation) in a central part.

The beam splitter 8 is mounted on a pivot 27 and can be deflected perpendicularly to the beam splitter plane (which corresponds to the plane of the drawing in FIG. 3) with the actuators 9, 10. As a result, an actuation of the actuator 9 produces a tilting of the beam splitter 8 about a first axis UA1, and an actuation of the actuator 10 produces a tilting of the beam splitter 8 about a second axis UA2. The linearly independent axes UA1, UA2 here extend orthogonally to one another and also orthogonally to the normal to the beam splitter plane.

Figure 4:
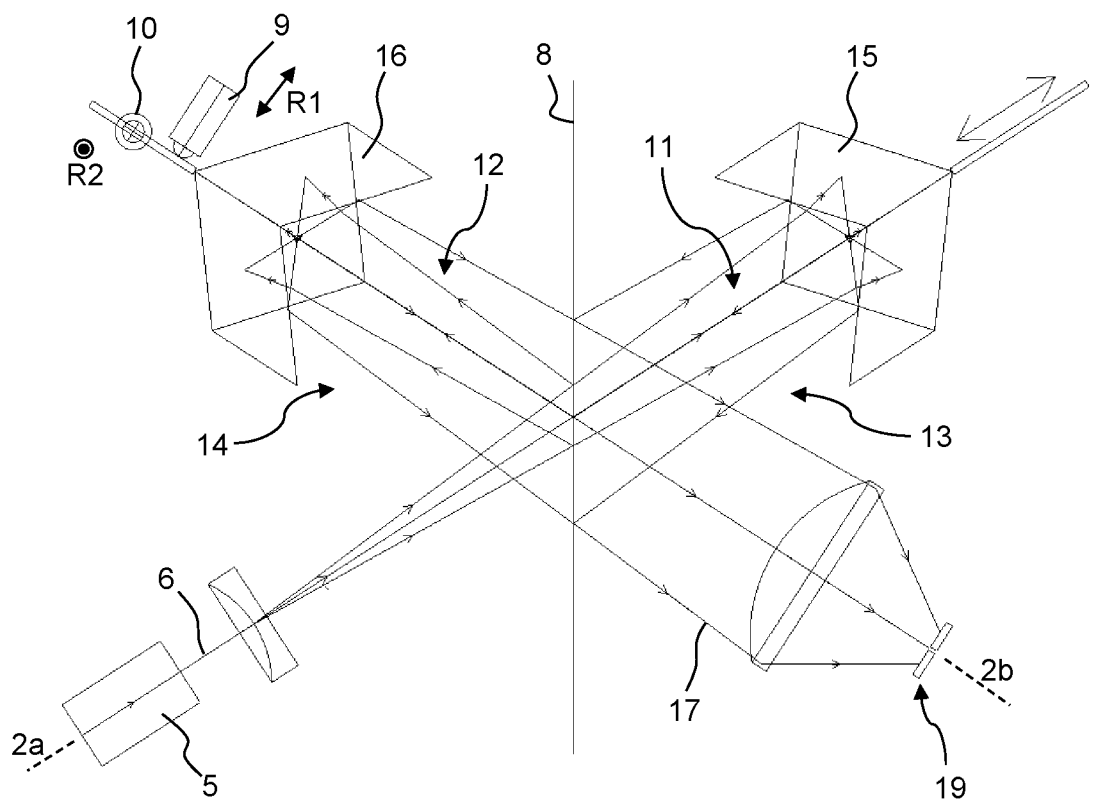
FIG. 4 shows a schematic, perspective view of a second embodiment of an interferometer arrangement according to the invention, with one fixed and one movable retroreflector.

FIG. 4 shows a second embodiment of an interferometer arrangement 1 according to the invention in a schematic plan view; this embodiment is similar to the embodiment from FIG. 1, and so here only the essential differences are explained. Moreover, once again only the reference light is illustrated for the sake of simplification.

In this embodiment, the retroreflector 15 is movable along the optical axis 2a by a drive, not illustrated in more specific detail, in order to alter the path difference between the interferometer arms 13, 14 ("movable retroreflector"). Furthermore, the retroreflector 16 can be deflected by two actuators 9, 10 in order to compensate for a possible lateral shear between the superimposed partial beams 11, 12 from the interferometer arms 13, 14. The retroreflector 16 can be moved by the actuator 9 along the direction R1 (in the plane of the drawing in FIG. 4) perpendicularly to the optical axis 2b, and the retroreflector 16 can be moved by the actuator 10 in the direction R2 (perpendicular to the plane of the drawing in FIG. 4) likewise perpendicularly to the optical axis 2b. However, the retroreflector 16 is not movable along the optical axis 2b ("fixed retroreflector"). The beam splitter 8 is not adjustable in this embodiment.

Figure 5:
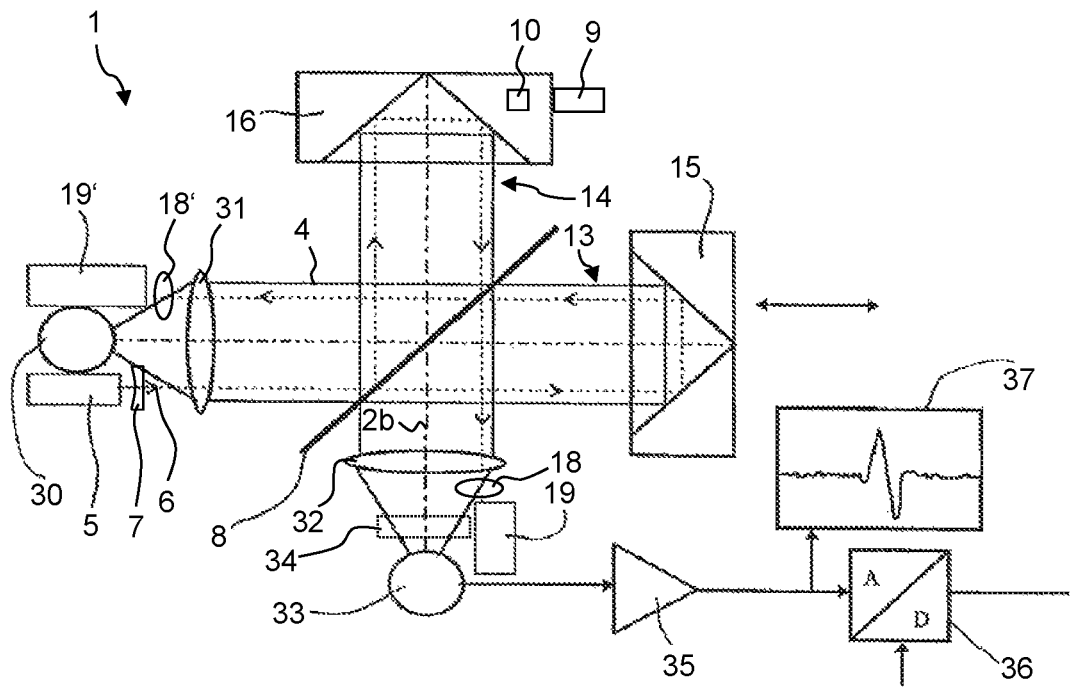
FIG. 5 shows a schematic diagram of the interferometer arrangement from FIG. 4, taking account of useful light.

FIG. 5 shows an overall overview of the interferometer arrangement 1 from FIG. 4.

The illustration in FIG. 5 reveals the useful light source 30, whose broadband IR light, cf. useful light 4, is parallelized at a lens 31. After passing through the interferometer arms 13, 14, the output-side useful light 20 is focused onto the useful light detector 33 at a further lens 32; the sample 34 to be examined is arranged here between the further lens 32 and the useful light detector 33, radiation passing through said sample in transmission.

The reference light 6 generated by the reference light source 5 and spread by a diverging element 7, after passing through the interferometer arms 13, 14, is registered as output-side reference light 17 partly by a converging element 18 at the reference light detector 19, here near the useful light detector 33, and partly also at the further reference light detector 19', here arranged in the vicinity of the useful light source 30. As a result, it is possible to determine a direction of the alteration of the path difference between the interferometer arms 13, 14 upon the movement of the retroreflector 15. According to the invention, the retroreflector 16 is displaceable transversely with respect to the optical axis 2b via the actuators 9, 10 in order to be able to compensate for lateral shears. At the reference light detector 19, which has at least three detector areas, phase differences between beam portions of the reference light are determined for this purpose (in this respect, see FIG. 6). The further reference light detector 19' is embodied as a single element.

The signal obtained at the useful light detector 33, said signal containing information about the sample 34, is amplified at an amplifier 35, and digitized at an A/D converter 36 and forwarded to an evaluation computer, not illustrated in more specific detail. In addition, the useful light signal can be output on a display 37.

In the embodiment shown in FIG. 5, the reference light detector 19 is arranged on the opposite side to the reference light source 5, and the further reference light detector 19' is arranged on the same side as the reference light source 5. It should be noted that an opposite arrangement is also possible, for example, in which the reference light detector 19 is arranged on the same side as the reference light source 5, and the further reference light detector 19' is arranged on the opposite side to the reference light source 5.

Figure 6:
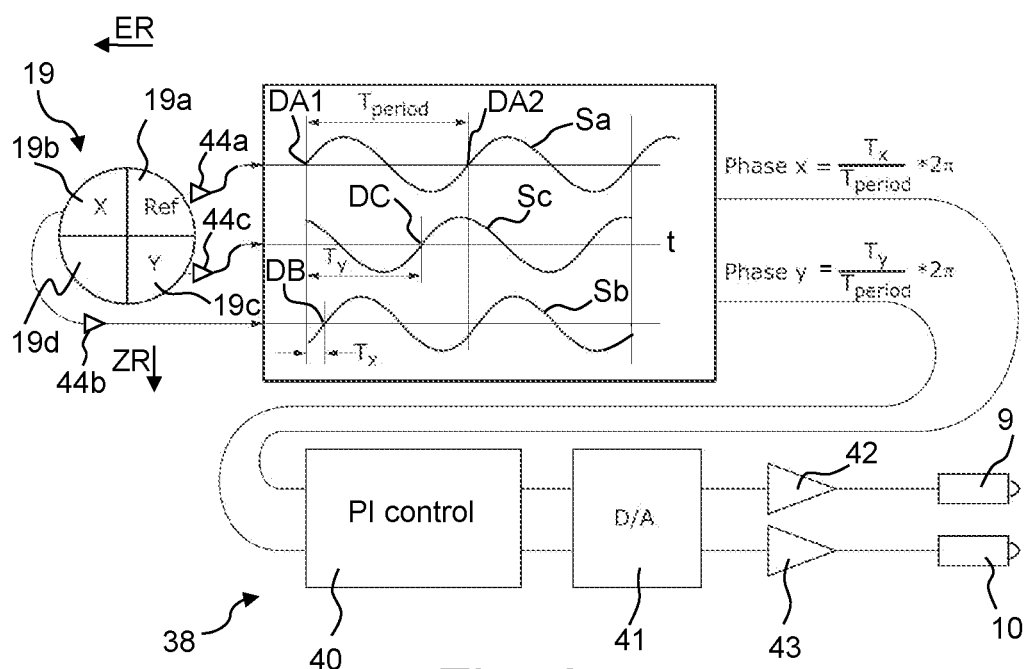
FIG. 6 shows a schematic overview concerning the function of control electronics for the invention.

FIG. 6 depicts the control electronics 38 for controlling the actuators 9, 10 of an interferometer arrangement according to the invention in more specific detail.

A reference light detector 19 is embodied here by a quadrant diode having a total of four detector areas 19a-19d, three detector areas 19a, 19b, 19c of which are required for the control according to the invention. The pair of detector areas 19a, 19b is lined up in a first direction ER, and the pair of detector areas 19a, 19c is lined up in a second direction ZR. The two directions ER, ZR are orthogonal to one another and also orthogonal to a central direction of incidence of the reference light to be detected (perpendicular to the plane of the drawing). The detector areas 19a-19d are illuminated by different directions of the reference light (that is to say different reference light components that propagate in different directions) downstream of the beam splitter and thus see different, local regions of the Haidinger fringes; the portion of the detector area 19a preferably lies in the direction of the optical axis 2b.

The path difference between the interferometer arms is altered within a movement cycle, thus resulting in constructive and destructive interference of the reference light alternately over time; given a uniform advance of the path difference, approximately sinusoidal signals Sa, Sb, Sc as a function of time t are obtained at the detector areas 19a, 19b, 19c after amplification by a respective current-voltage converter 44a-44c. The signal Sa at the detector area 19a here is a common reference signal for both pairs 19a/19b and 19a/19c.

A phase difference between the signals Sa and Sb and between the signals Sa and Sc is established depending on the lateral shear of the superimposed reference light partial beams downstream of the beam splitter 8.

In the variant illustrated, firstly the period Tperiod of the reference signal Sa is determined by the temporal separation of the adjacent crossings DA1, DA2 through the average signal amplitude ("moving average value" or "zero crossing") of said signal Sa being determined.

For the signal Sb, the position of the crossing DB through the average signal amplitude of said signal is then determined, and the temporal separation $Tx=DA1-DB$ is determined. For the signal Sc, in the same way, the position of the crossing DC through the average signal amplitude of said signal is determined, and the temporal separation $Ty=DA1-DC$ is determined. The phase x (also called phase difference x) between the signals Sa and Sb then results as Phase $x=Tx/Tperiod*2\pi$.

The phase y (also called phase difference y) between the signals Sa and Sc results as Phase $y=Ty/Tperiod*2\pi$.

In order to control the actuators 9, 10, the phase x and the phase y are determined repeatedly (typically only during a specific part of a movement cycle, for instance around a path difference of "zero", ZPD=zero path difference) and are compared with associated stored setpoint values. The actuators 9, 10 are readjusted in the event of deviations from the setpoint values.

For this purpose, a digital proportional-integral controller (PI controller) 40 is preferably used, which evaluates the phases x, y. The output signals thereof are converted into analog signals by a D/A converter 41, amplified in high-voltage amplifiers 42, 43 and applied to the actuators (here piezo-actuators) 9, 10. As a result, the interferometer arrangement can be set to constant phase differences between the signals of the detector areas 19a/19b and 19a/19c, and a constant (and typically minimal) lateral shear can thus be attained.

The stored setpoint values for the phase differences, that is to say for the values of phase x and phase y, are generally determined upon a first start-up of the interferometer arrangement. An adjustment position of the retroreflectors is sought which yields a maximum intensity of useful light at the useful light detector; said adjustment position generally corresponds to a minimal lateral shear. The values for phase x, phase y measured at the maximum useful light intensity become the future setpoint values to be adjusted. It should be noted that these setpoint values of phase x, phase y usually deviate from 0°, and can usually be found in the range of up to +/−35°. The phase determination should be effected in an always identical partial region of a movement cycle around a path difference of "zero" since the phase angle generally varies over a movement cycle and is substantially independent of the illumination of the reference light detector only in the vicinity of ZPD.

Figure 7:
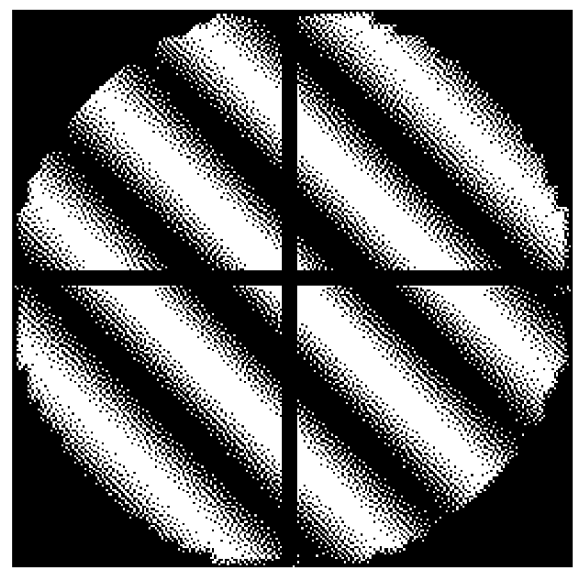
FIG. 7 shows an intensity distribution on a quadrant diode as reference light detector in an interferometer arrangement according to the invention, with partial beams of the interferometer arms subjected to large shear.

FIG. 7 shows a simulated intensity distribution (bright/low point density=high intensity; dark/high point density=low intensity) at a reference light detector embodied by a quadrant diode (in this respect, cf. FIG. 6), in the case of an extremely severe misalignment of the retroreflectors as a result of lateral shear in both directions x and y, here in the case of a ZPD position (path difference of zero). On account of the severe misadjustment, a plurality of interference fringes running from top left to bottom right (with four bright-dark transitions) can be seen; the associated phase differences here are greater than 360°, such that the phase assignment by way of the signals of the detector areas is no longer unambiguous.

Figure 8:
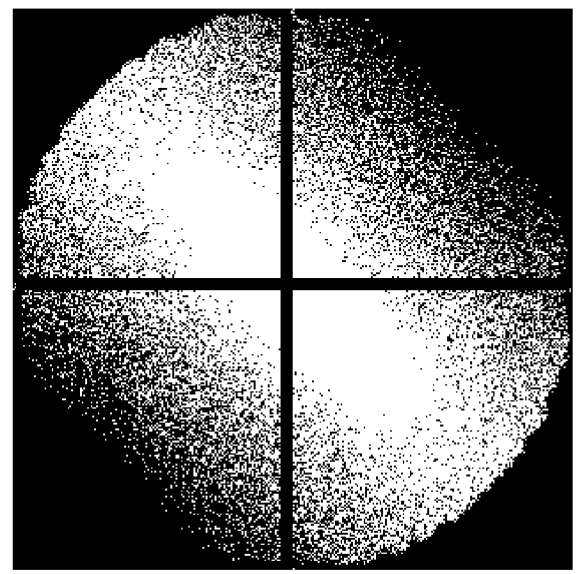
FIG. 8 shows an intensity distribution on a quadrant diode as reference light detector in an interferometer arrangement according to the invention, with partial beams of the interferometer arms subjected to slight shear.

FIG. 8 shows a simulated intensity distribution at the reference light detector (cf. FIG. 6), with a very much smaller misalignment in x and y, once again in the case of a ZPD position. The phase difference here in x and y is in each case approximately 180° and can be determined well by way of the signals of the detector areas. Only one bright-dark transition can be seen, with one bright interference fringe running from top left to bottom right. In practice the misalignment of the retroreflectors is even smaller, and the phase differences then observed are accordingly even smaller (but that then would no longer be discernible in the figures).

FIGS. 7 and 8 show how the phase differences of the signals of the different pairs of detector areas of the reference light detector depend on the degree of misalignment as a result of lateral shear, and a constant adjustment position in relation to the lateral shear can thus be achieved with an adjustment of the phase differences to a respective setpoint value.

LIST OF REFERENCE SIGNS

1 Interferometer arrangement
2a Input-side optical axis
2b Output-side optical axis
3 Input for useful light
4 Useful light 5 Reference light source
6 Reference light
7 Diverging element
8 Beam splitter
9, 10 Actuator
11, 12 Reference light partial beam
13, 14 Interferometer arm
15, 16 Retroreflector
17 Output-side reference light
18 Converging element
18' Further converging element
19 Reference light detector
19' Further reference light detector (single element)
19a-19d Detector areas of the reference light detector
20 Output-side useful light
21 Output for useful light
22 Pendulum
23 Axis of rotation
24 Drive
25 Deposited coating for reference light
26 Deposited coating for useful light
27 Pivot
30 Useful light source
31 Lens
32 Further lens
33 Useful light detector
34 Sample
35 Amplifier
36 A/D converter
37 Display
38 Control electronics
40 PI controller
41 D/A converter
42, 43 High-voltage amplifier
44a-44c Current-voltage converter
DA1, DA2 Zero crossings (signal Sa)
DB Zero crossing (signal Sb)
DC Zero crossing (signal Sc)
ER First direction (detector areas of the reference light detector)
Phase x Phase difference (signals Sa, Sb)
Phase y Phase difference (signals Sa, Sc)
R1 First direction (retroreflector)
R2 Second direction (retroreflector)
Sa-Sc Signals at detector areas
t Time
Tperiod Period length
Tx Separation of zero crossings (DA1, DB)
Ty Separation of zero crossings (DA1, DC)
UA1 First linearly independent axis
UA2 Second linearly independent axis
ZR Second direction (detector areas of the reference light detector)

What is claimed is:

1. An interferometer arrangement, comprising
an input for useful light,
a beam splitter,
two retroreflectors establishing two interferometer arms,
a drive configured to move at least one of the retroreflectors to alter an optical path difference between the interferometer arms,
a reference light source for coherent reference light,
a useful light output,
and a reference light detector,
 wherein the reference light detector has at least three detector areas,
 wherein detector areas of a first pair of the at least three detector areas are lined up in a first direction, and detector areas of a second pair of the at least three detector areas are lined up in a second direction, and wherein the first direction, the second direction and a central propagation direction of the reference light at the reference light detector are linearly independent with respect to one another,
a converging element, arranged between the beam splitter and the reference light detector, for focusing the reference light from the beam splitter onto the reference light detector,
at least two actuators arranged to alter a lateral shear between two reference light partial beams, which are reflected back respectively from the interferometer arms and are superimposed at the beam splitter, in at least two degrees of freedom, and
control electronics adapted to control the actuators in accordance with signals output at the detector areas of the reference light detector.

2. The interferometer arrangement as claimed in claim 1,
wherein the reference light source is a reference laser,
wherein the first direction, the second direction and the central propagation direction of the reference light at the reference light detector are orthogonal with respect to one another,
wherein the converging element for the reference light is a converging lens, and
wherein the at least two actuators are arranged at the beam splitter or are arranged at at least one of the retroreflectors.

3. The interferometer arrangement as claimed in claim 1, configured such that the reference light reaching the beam splitter from the reference light source has at the beam splitter a minimum spread (MSP),
 wherein MSP≥2 mrad.

4. The interferometer arrangement as claimed in claim 3,
 wherein the minimum spread (MSP) is established by a minimum divergence MDIV of the reference light or a minimum intermediate angle MZW of discrete partial beams of the reference light, and
 wherein MSP≥5 mrad,
 said interferometer arrangement further comprising:
a diverging element for the reference light, configured as a diverging lens and arranged between the reference light source and the beam splitter, or
a reference light source having an inherent divergence DIV≥MSP, or
a splitting element for the reference light, which is configured as a beam splitter and a wedge plate arrangement and which splits the reference light among three or four discrete partial beams, which form the minimum intermediate angle MZW in pairs, and which impinge on separate detector areas of the reference light detector.

5. The interferometer arrangement as claimed in claim 1, wherein the reference light detector comprises a quadrant diode.

6. The interferometer arrangement as claimed in claim 1, wherein the beam splitter is configured to be tilted about two linearly independent axes by the actuators.

7. The interferometer arrangement as claimed in claim 1, wherein one of the retroreflectors is configured to be displaced along two linearly independent directions by the actuators.

8. A method for operating an interferometer arrangement, comprising:

splitting coherent reference light from a reference light source at a beam splitter between a first interferometer arm having a first retroreflector and a second interferometer arm having a second retroreflector, superimposing the reference light from the two interferometer arms at the beam splitter and detecting the superimposed reference light at a reference light detector, moving at least one of the retroreflectors in repeating movement cycles and thereby altering an optical path difference between the interferometer arms, focusing the reference light downstream of the beam splitter onto the reference light detector, wherein the reference light detector has at least three detector areas, wherein detector areas of a first pair of the at least three detector areas are lined up in a first direction, and detector areas of a second pair of the at least three detector areas are lined up in a second direction, and wherein the first direction, the second direction and a central propagation direction of the reference light at the reference light detector are linearly independent with respect to one another, for at least respective ones of the movement cycles determining a first phase difference between two reference light components detected at the first pair of the at least three detector areas, determining a second phase difference between two reference light components detected at the second pair of the at least three detector areas, and with at least two actuators, altering a lateral shear between two reference light partial beams, which are reflected back respectively from the interferometer arms and are superimposed at the beam splitter, in at least two degrees of freedom and in accordance with the first phase difference and the second phase difference.

9. The method as claimed in claim 8, wherein the two phase differences are kept substantially constant with the repeated movement cycles.

10. The method as claimed in claim 8,
wherein the reference light is focused by a converging element between the beam splitter and the reference light detector, and
wherein the first direction, the second direction and the central propagation direction of the reference light at the reference light detector are orthogonal with respect to one another.

11. The method as claimed in claim 8,
wherein the reference light reaching the beam splitter from the reference light source has at the beam splitter a minimum spread MSP,
wherein MSP≥2 mrad.

12. The method as claimed in claim 11, further comprising:
establishing the minimum spread MSP by a minimum divergence MDIV of the reference light or by a minimum intermediate angle MZW of the discrete partial beams of the reference light, and
wherein the method further comprises one of:
expanding the reference light from the reference light source to a greater divergence with a diverging element between the reference light source and the beam splitter, or
selecting a reference light source having an inherent divergence DIV≥MSP, or
splitting the reference light into three or four discrete partial beams with a splitting element, wherein the discrete partial beams form the minimum intermediate angle MZW in pairs and impinge on separate detector areas of the reference light detector.

13. The method as claimed in claim 8, wherein the degrees of freedom comprise tiltings of the beam splitter with respect to two linearly independent axes.

14. The method as claimed in claim 8, wherein the degrees of freedom comprise displacements of one of the retroreflectors with respect to two linearly independent directions.

15. The method as claimed in claim 8, wherein said determining of a respective one of the phase differences comprises measuring temporal separation of zero crossings of two electrical detector signals which were determined respectively with respect to the reference light components, relative to their period length.

16. The method as claimed in claim 8:
wherein said determining of the phase differences comprises always using only a mutually identical partial region of the movement cycle, and
wherein the partial region contains an optical path difference between the interferometer arms of zero.

17. The method as claimed in claim 8, further comprising:
recording a useful light interferogram, wherein:
useful light from a useful light source through an input for the useful light at the beam splitter is split between the first interferometer arm having the first retroreflector and the second interferometer arm having the second retroreflector, and the useful light from the two interferometer arms is superimposed at the beam splitter and through the useful light output is detected at a useful light detector,
and respective individual useful light amplitude measurements are carried out during a movement cycle with different optical path differences between the interferometer arms, and
recording further useful light interferograms.

18. The method as claimed in claim 17, wherein a plurality of the useful light interferograms are recorded in succession for an overall measurement, and wherein the respective individual useful light amplitude measurements of the same optical path difference of the useful light interferograms of the overall measurement are summed.

19. The method as claimed in claim 18, wherein said determining of the first and second phase differences and a corresponding readjustment of the at least two actuators are effected at least for every hundredth one of the useful light interferograms of the overall measurement.

20. The method as claimed in claim 17, further comprising:
after exchange or reinstallation of a component of the interferometer arrangement, determining firstly an optimum position and/or orientation of the component, in order to obtain a given useful light intensity at the useful light detector,
determining an associated first initial phase difference value and an associated second initial phase difference value for reference light components with respect to the optimum position and/or orientation of the component, and
during a subsequent measurement operating mode in which the useful light interferograms are recorded, readjusting the first phase difference and the second phase difference to the first initial phase difference value determined and the second initial phase difference value determined.

* * * * *